United States Patent
Opper et al.

(10) Patent No.: US 8,162,702 B2
(45) Date of Patent: Apr. 24, 2012

(54) CONTACT-MAKING UNIT, ATTACHMENT METHOD AND SCREWING TOOL FOR CARRYING OUT THE METHOD

(75) Inventors: Reinhold Opper, Buseck (DE); Jochen Hain, Eschenburg-Wissenbach (DE); Michael Krengel, Friedrichsdorf (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/275,808

(22) Filed: Nov. 21, 2008

(65) Prior Publication Data

US 2009/0137160 A1 May 28, 2009

(30) Foreign Application Priority Data

Nov. 21, 2007 (DE) .......................... 10 2007 057 082

(51) Int. Cl.
*H01R 4/30* (2006.01)
(52) U.S. Cl. ...................... 439/801; 439/793
(58) Field of Classification Search .................. 439/801, 439/727, 813, 411, 412, 431, 432, 564, 573, 439/657, 771, 805, 809, 810, 814, 790–793; 411/999, 396; 174/51
See application file for complete search history.

(56) References Cited

U.S. PATENT DOCUMENTS

| | | | |
|---|---|---|---|
| 3,928,079 A | 12/1975 | Jennings et al. | |
| 5,092,723 A * | 3/1992 | Compton et al. | 411/396 |
| 5,192,234 A * | 3/1993 | Heng et al. | 439/806 |
| 5,314,360 A * | 5/1994 | Jaag | 439/811 |
| 5,442,133 A | 8/1995 | Arnold et al. | |
| 6,027,382 A | 2/2000 | Reindl et al. | |
| 6,042,431 A * | 3/2000 | Hayakawa | 439/801 |
| 6,079,923 A * | 6/2000 | Ross et al. | 411/999 |
| 7,281,962 B2 * | 10/2007 | Dolzer et al. | 439/801 |
| 2002/0171395 A1 | 11/2002 | Streuer | |
| 2008/0118325 A1 | 5/2008 | Opper et al. | |

FOREIGN PATENT DOCUMENTS

| | | |
|---|---|---|
| DE | 809826 C | 8/1951 |
| DE | 7821308 U1 | 12/1979 |
| DE | 29616631 U1 | 11/1996 |
| DE | 102006015632 A | 10/2007 |
| DE | 102006056065 A1 | 5/2008 |
| EP | 0641944 A1 | 3/1995 |
| EP | 0780922 A | 6/1997 |
| EP | 1263063 A | 12/2007 |
| GB | 824012 A | 11/1959 |

OTHER PUBLICATIONS

European Search Report dated Apr. 2, 2009.
European Search Report Dated Feb. 16, 2012.

* cited by examiner

*Primary Examiner* — Felix O Figueroa
(74) *Attorney, Agent, or Firm* — Michael P. Leary

(57) ABSTRACT

A contact-making unit including a holding unit and a screw with a head and a shank. The holding unit includes a connection part-holding section into which at least one connection part can be inserted, and a screw-holding section into which the screw is inserted in a longitudinal direction of the holding unit in such a way that the screw is held captively in the screw-holding section in the longitudinal direction but in a rotatable fashion, and in that a connection part which is inserted into the connection part-holding section can make electrical contact with the inserted screw. A radially protruding bearing section is formed on the head of the screw, and the screw-holding section has a shoulder section which axially supports the bearing section on the holding unit.

20 Claims, 6 Drawing Sheets

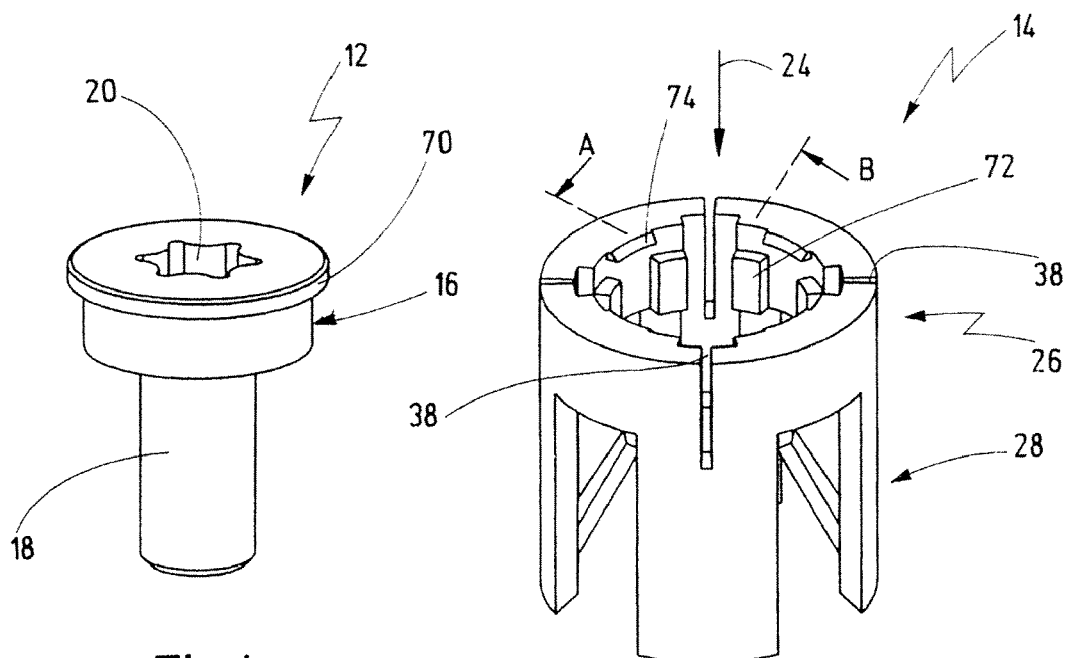
Fig.4
Fig.5
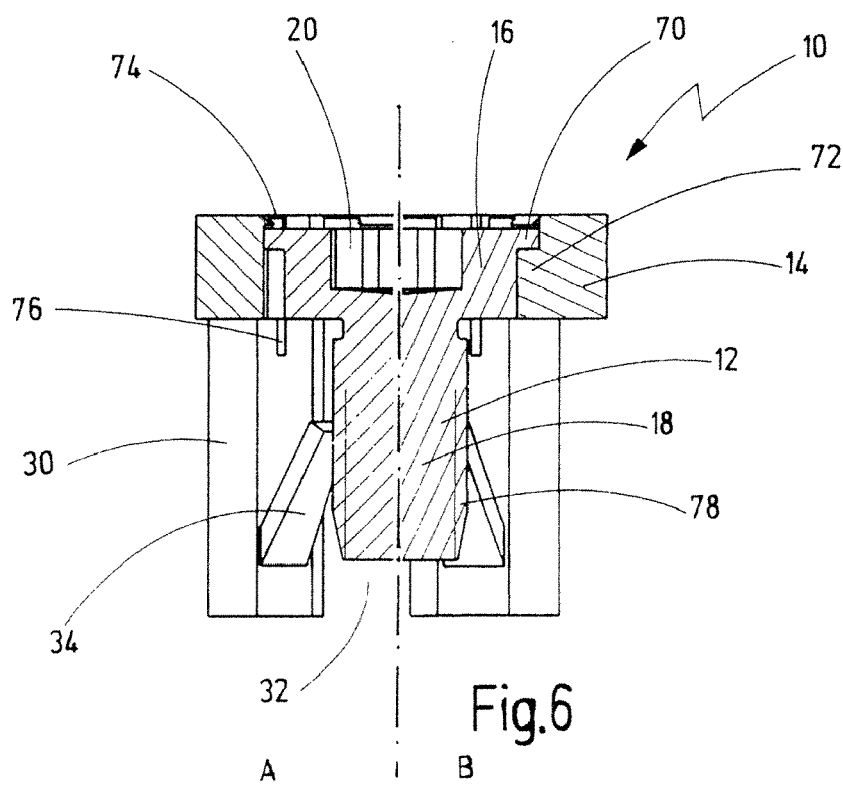
Fig.6

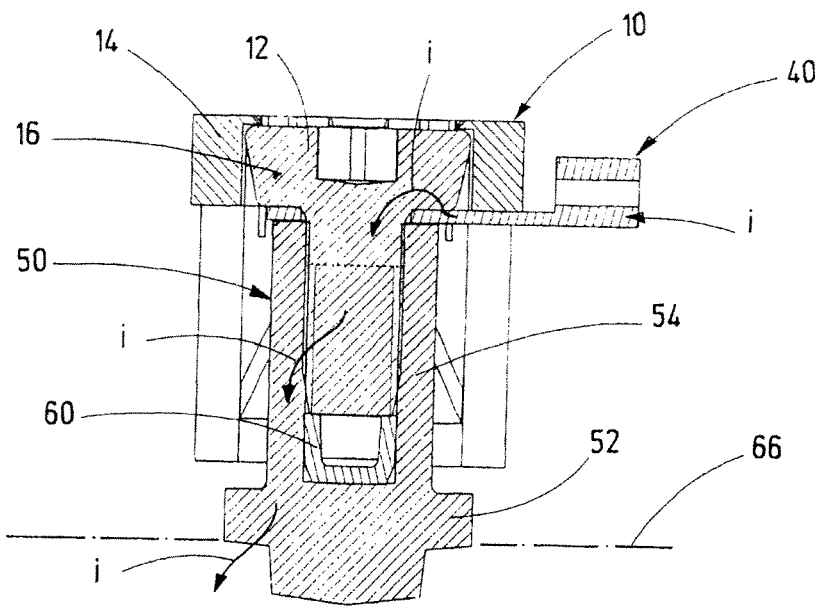
Fig.10
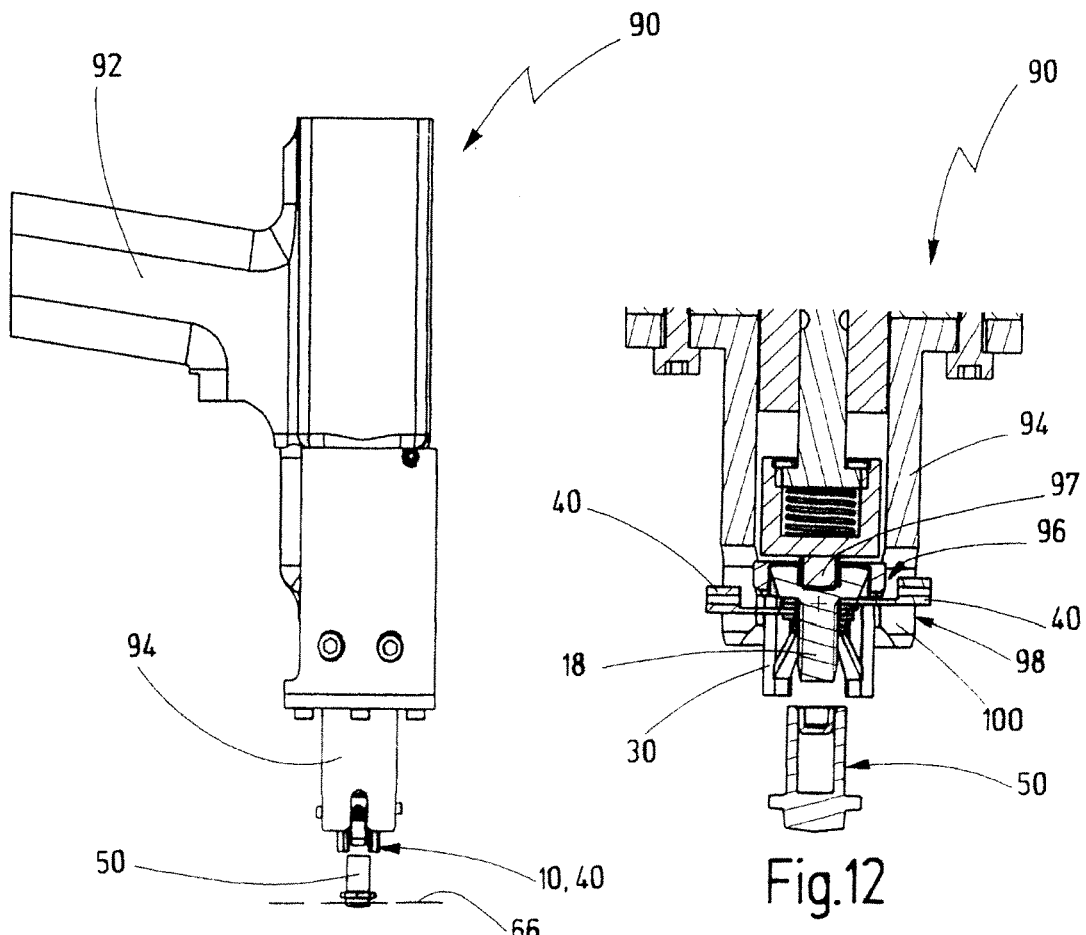
Fig.11
Fig.12

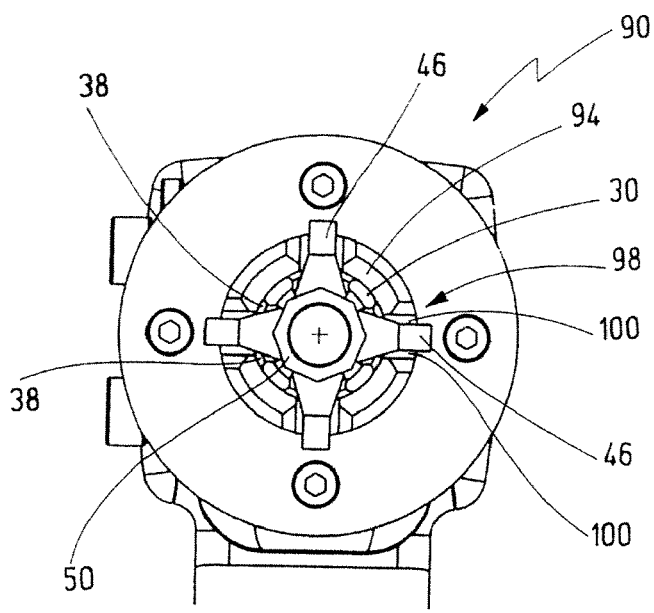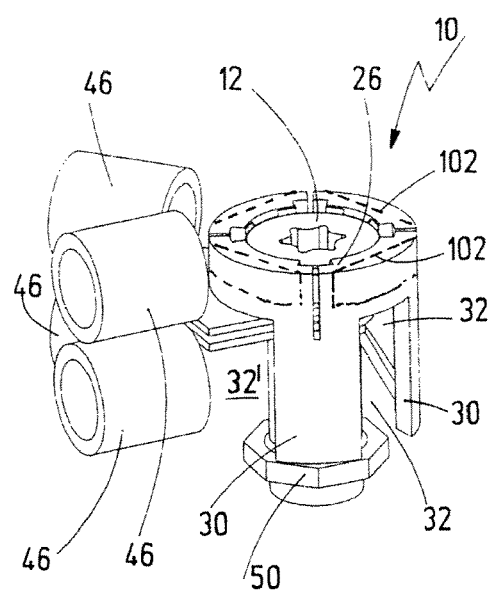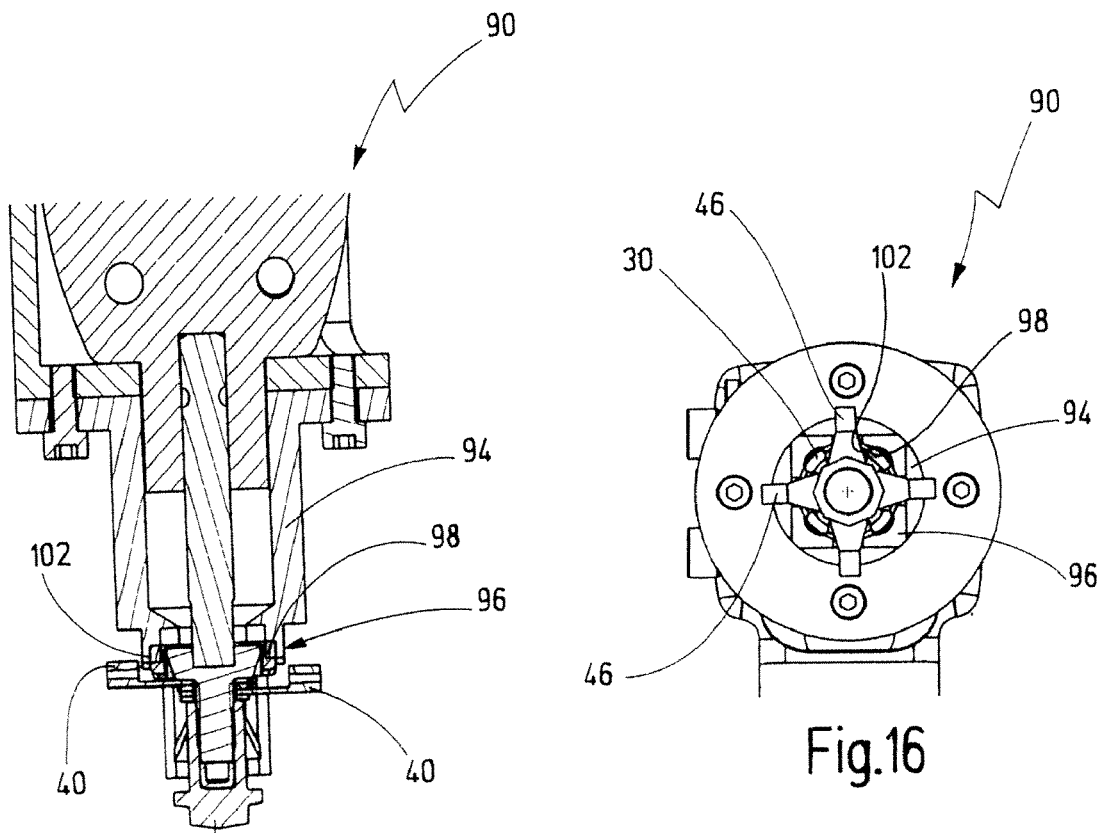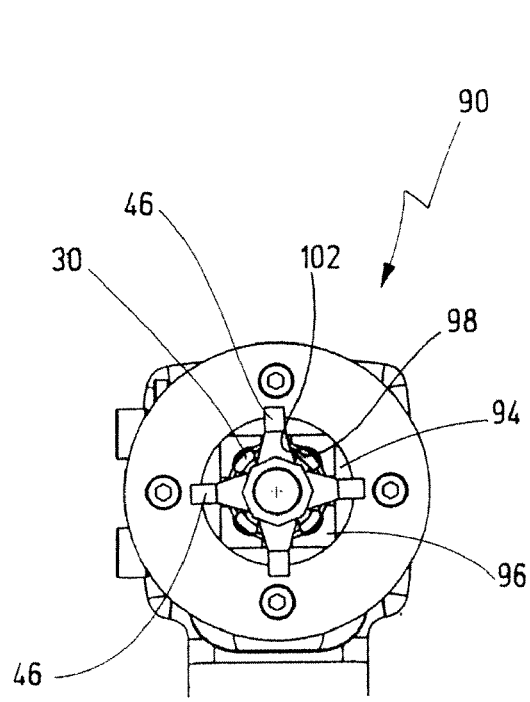
Fig.13
Fig.14
Fig.15
Fig.16

CONTACT-MAKING UNIT, ATTACHMENT METHOD AND SCREWING TOOL FOR CARRYING OUT THE METHOD

CROSS-REFERENCE TO RELATED APPLICATIONS

This application claims the benefit of German Application No. 10 2007 057 082.3, filed Nov. 21, 2007, the disclosure of which is incorporated herein by reference.

BACKGROUND OF THE INVENTION

The invention relates to a premounted (preassembled) contact-making unit having a screw which has a head and a shank, and a holding unit.

In addition, the present invention relates to a holding unit for such a contact-making unit, and to a method for attaching at least one connection part to a workpiece, and a screwing tool for carrying out this attachment method.

Generally, the present invention is concerned with the field of what are referred to as earthing bolts (grounding studs), such as are often used in particular in motor vehicle engineering. In order to establish a stable earthing contact, a bolt or a nut is welded onto a piece of sheet metal of a vehicle bodywork so that the bolt or the nut is connected to the piece of sheet metal in an electrically conductive fashion. A connection part such as a cable lug is then connected electrically to the bolt or to the nut by screwing a nut onto the bolt or screwing a screw into the nut. In this context it is generally problematic that a surface coating process takes place between the welding on of the bolt (nut) and the securing of the connection part (cable lug). In order to keep the contact faces for the establishment of an electrical connection free of surface coating, it is known to cover these contact sections. The covering parts which are used for this are discarded here before the connection part is secured. The document EP 0 641 944 A1 discloses using as a covering part a nut which is subsequently also used again to attach the connection part. For this reason it is not necessary to discard a part. However, the mounting process overall is somewhat more complex.

German patent application 10 2006 056065.5 forms a prior art according to paragraph 3(2) of the German patent law.

From this application it is known to weld a bolt with an axial blind hole onto a piece of sheet metal. In this context, the blind hole bolt has, in the blind hole, a first threaded section which is covered by a covering part (in particular a plug which is relatively short and is inserted into the blind hole from above). A cable lug is threaded onto a screw with a second threaded section and the screw is screwed into the blind hole. In this context, the plug is also pressed downwards onto the bottom of the blind hole. Of the two threaded sections, at least one threaded section can be embodied as a self-tapping threaded section. Accordingly, in this context electrical contact is established between the cable lug and the underside of a head of the screw, and via the self-tapping threaded engagement between the screw and the blind hole bolt and consequently with the piece of sheet metal onto which the blind hole bolt is welded.

In this context, it is also known from the aforesaid German patent application to insert at least one cable lug in the radial direction into a holding unit and then introduce a screw into the holding unit. In this context, the shank of the screw penetrates the hole in the cable lug, and latching means engage behind the head of the screw. Consequently, a pre-mounted attachment arrangement is provided which has the holding part, the screw and at least one cable lug which is threaded onto the screw. Since the screw penetrates the hole in the cable lug, the cable lug is pre-vented from being pulled out radially from the holding unit. In addition, there may be further latching means present in order to prevent the screw from dropping out of the holding part. In one particular embodiment, apart from radial holes for laterally introducing cable lugs it is also possible to provide, in the case of one holding part, that a further cable lug is pressed from below in the axial direction into the holding device onto the pre-mounted attachment arrangement, composed of the holding part, the screw and the at least one cable lug. This particular embodiment can, as a result, be used as follows. The premounted attachment arrangement set out above can be premounted on a cable lug. In this context, it is possible, for example, for one or more cable lugs to be inserted laterally into the holding unit and subsequently guided by the screw in order to hold both the screw and the cable lugs on the holding unit in a captive fashion. When the cable harness is mounted, it is then possible subsequently to insert one or more further cable lugs from below, that is to say in the longitudinal direction, into the holding part locally and push them onto the screw before the screw is screwed into a blind hole bolt (earthing bolt) described above.

Against the background above, an aspect of the invention is to specify an improved system for implementing an earthing connection and arrangements and methods which can be used for this purpose.

According to an aspect of the invention, a premounted (preassembled) contact-making unit having a screw which has a head and a shank, and a holding unit, wherein the holding unit has a connection part-holding section into which at least one connection part can be inserted, and a screw-holding section into which the screw is inserted in the longitudinal direction in such a way that the screw is held therein captively in the longitudinal direction but in a rotatable fashion, and in that a connection part which is inserted into the connection part-holding section can make electrical contact with the inserted screw, wherein a radially protruding bearing section is formed on the head, and the screw-holding section has a shoulder section by means of which the bearing section is supported axially on the holding unit.

With the premounted contact-making unit it is possible to prefabricate a holding unit and a screw. Since the screw, the holding unit and the blind hole bolt are preferably manufactured by the same manufacturer, the screw can here be coordinated with a blind hole bolt, in particular in the case of an embodiment with a self-tapping thread. The premounted contact-making unit can be used during the manufacture of a cable harness to insert connection parts, for example cable lugs, into the connection holding section.

Also according to the above aspect, a premounted contact-making unit, having an annular section and a plurality of longitudinal webs which extend in the longitudinal direction from one side of the annular section, wherein a shoulder section on which a bearing section of a screw can be axially supported is formed on the inner circumference of the annular section, said bearing section being formed on the outer circumference of a head of the screw, wherein in addition first latching means which are configured so as to engage behind the bearing section from the other axial side are formed on the inner circumference of the annular section, wherein at least one connection part can be inserted between the plurality of longitudinal webs in such a way that a connection section of the connection part extends in the radial direction between two longitudinal webs, wherein second latching means which are configured so as to hold an inserted connection part in a captive fashion are formed on the longitudinal webs.

As a result of the measure of providing, on the inner circumference of the annular section, first latching means which are configured to engage behind the bearing section or another part of the screw from the other axial side, the screw can be correctly positioned in the holding section. In other words, the screw can be positioned aligned precisely in the longitudinal direction in the holding part. Owing to this optimized centring of the screw, connection parts can easily be inserted into the holding part. The centring also permits facilitated screwing into a blind hole bolt or the like. Since the centring is preferably carried out by means of the bearing section on the outer circumference of the head, the latter advantageously has no influence on a contact surface on the underside of the head.

The above aspect is also achieved by a method for attaching at least one connection part on a workpiece, having the steps: a) provision of a premounted contact-making unit which has a first attachment element and a holding unit on which the first attachment element is held in a captive fashion, b) insertion of the at least one connection part into the holding unit, wherein the connection part makes contact with the first attachment element, and connection of the first attachment element to a second attachment element which is secured to the workpiece.

The manufacture of an earthing contact can easily be implemented in this way with a small number of steps. Providing the pre-mounted contact-making unit makes it possible to plug on in each case one or more connection parts (such as cable lugs) at a cable harness manufacturer and/or during the mounting of the cable harness (for example on a vehicle bodywork), and the screw can subsequently be easily secured, by virtue of its correct positioning, in a second attachment element (such as for example the blind hole or the bolt) which has been attached to the workpiece in advance. No connection parts are preferably secured to the premounted contact unit before step b).

In addition, according to an aspect of the invention it is possible to monitor the connection process in an attachment method for connecting a first attachment element to a second attachment element by means of a self-tapping threaded engagement, by virtue of the fact that the torque which is applied during the connecting process is measured over time and/or the rotational angle.

Since, in the case of a self-tapping threaded engagement, there is an increased demand for torque from the start of the threaded engagement and said demand can be measured, it is possible, for example, to sense the rotational angle or the number of rotations of the first attachment element with respect to the second attachment element. As a result, the connection process can be monitored.

Finally, the above may be achieved by a screwing tool for carrying out the above-described attachment method, having a tool section which is configured so as to engage on a tool engagement portion which is provided on a head of the first attachment element in order to apply torque to the head, and having an anti-rotation device which is configured so as to prevent rotation of the at least one connection part, while the first attachment element is screwed onto the second attachment element.

With this type of screwing tool it is consequently possible to ensure that a cable set which is connected to the connection parts cannot rotate.

With the previously mentioned, premounted contact-making unit it is preferred if the screw-holding section has first latching means which engage radially behind the bearing section so that the screw is held captively in the longitudinal direction in the holding unit.

In this way it is possible to ensure that the screw does not become detached from the holding unit.

The bearing section, the shoulder section and the first latching means may be embodied in such a way that the screw is aligned axially in the holding unit, in particular is held centred in the longitudinal direction, in which case the advantages described above can be achieved.

The bearing section and/or the shoulder section may be embodied in a stepped fashion.

The bearing section can be embodied here, for example, as a flange section (collar) which protrudes radially from the head of the screw.

As an alternative to this it is possible to make the bearing section and/or the shoulder section conical in design.

In this embodiment the screw can be embodied as a counter sunk head screw.

Overall it is also preferred if the screw is held completely within the holding unit.

In other words it is possible to ensure that the screw is completely surrounded by the holding unit. This is advantageous in particular if the screw is manufactured from metal and if the holding unit is manufactured from plastic. It is possible to ensure here that the screw does not cause any damage to other parts (bodywork of a vehicle) during transportation or mounting.

According to another embodiment, the connection part-holding section has second latching means in order to hold the at least one connection part, to be inserted therein, in a captive fashion in the longitudinal direction.

There is in particular provision here that a connection part that is inserted into the holding section is held in the axial direction by the head of the screw. Measures may be taken so that a connection part which is inserted first into the holding unit can make contact electrically with the underside of the head of the screw reliably and over a large area. In the other axial direction, the second latching means serve to prevent the connection part from dropping out of the holding unit.

Although latching means may be provided both for the screw and for the connection parts in order to hold the screw or connection parts on the holding unit in a captive fashion, it is generally also conceivable to provide clamping means or the like instead of the latching means.

The connection part-holding section may also have for a connection part which is to be inserted therein, a radial recess through which a connection section of the connection part can extend outwards in the radial direction.

In particular when a plurality of such radial recesses which are arranged distributed over the circumference of the holding part are formed, it is possible as a result to ensure that the cable lugs cannot slide one over the other when the screw is screwed tight onto a blind hole bolt or the like.

In addition, the sections of the connection part which extend between the radial recesses can be used to support the second latching means in order to hold the connection parts in a captive fashion.

The radial recess may extend in the longitudinal direction from one end of the holding unit.

In this embodiment it is possible to introduce the connection parts into the holding unit exclusively in the axial direction. This makes it possible to insert connection parts successively into the holding unit at different locations, that is to say for example when the cable harness is manufactured, when the cable harness is mounted, in the case of repair work and/or when electric accessories (for example subsequent installation of a radio or navigation device) are mounted and when a further cable lug for forming an earth contact is used, as is possibly necessary in this context.

According to another embodiment, the connection part-holding section is embodied in such a way that a plurality of connection parts can be held therein, wherein the connection parts can be inserted into the connection part-holding section exclusively in one direction which is opposed to the direction in which the screw is inserted into the screw-holding section.

This embodiment of the premounted contact-making unit is also considered to be a separate invention, independently of the formation of a bearing section or of a shoulder section.

Since the situation is avoided in which connection parts are inserted radially or laterally into a holding part, it is possible to enable the premounted contact-making unit to be manufactured exclusively from the screw and the holding unit, wherein the connection parts (cable shoes) can all be introduced subsequently into the premounted contact-making unit.

In addition it is advantageous if the holding unit has, on the outer circumference, an anti-rotation section on which an anti-rotation device of a tool, by means of which the screw can be screwed to an attachment element, can engage.

In this context as a result of the engagement of the anti-rotation device of the tool on the anti-rotation section the cable set is prevented from being able to rotate when the screw is screwed on to an attachment element (blind hole bolt). The anti-rotation device on the tool can be made relatively small. In addition, an anti-rotation means can be implemented independently of the geometry of the connection parts.

In the case of the attachment method which is used for monitoring it is particularly preferred if the start of the threaded engagement is sensed by sensing the torque requirement which is increased by the self-tapping threaded engagement, and if the rotational angle or the number of rotations is sensed from the start of the threaded engagement up to the tightening of the threaded connection.

As a result it is possible to monitor the entire connection or screwing process.

This makes it possible to determine whether a correct number of connection parts has been inserted between the first and the second attachment elements (since given a different number of connection parts there are also different rotational angles or revolutions until the threaded connection is tightened).

It may also be advantageous if the measured torque curve is compared with at least one target curve or envelope curve which is specified for a predefined number of connection parts to be secured and/or for a predefined length of threaded engagement.

In the case of the screwing tool according to the invention, the anti-rotation device may be configured so as to engage on an anti-rotation section of the holding unit. The anti-rotation device can be made compact here, in particular in the longitudinal direction.

According to another embodiment, the anti-rotation device is configured so as to engage on at least one connection section, protruding radially from the holding unit, of the at least one connection part.

This embodiment also ensures that the cable set cannot rotate when the screw is screwed tight in the blind hole bolt. In this context, the connection parts themselves are prevented from rotating. In other words, the connection sections of the connection parts abut against the anti-rotation device so that damage to the holding unit (preferably manufactured from plastic) is avoided. The connection sections of the connection parts are preferably formed by metallic sections.

The screwing tool may have a tubular mouthpiece into which the holding unit can be introduced.

In particular it is possible as a result to insert the entire pre-mounted contact-making unit, including the connection parts which have been introduced into it, into the mouthpiece in order subsequently to screw the screw into the corresponding attachment element (for example blind hole bolt) by means of the screwing tool.

A holding device may be formed on the mouthpiece in order to hold the holding unit on the mouthpiece. The holding device can be a clamping holding device or a latching holding device.

In addition, the anti-rotation device may be formed on the mouthpiece.

As a result, the mouthpiece can not only fulfil the function of holding the premounted contact-making unit but can also fulfil the function of preventing rotation of the cable set during the screwing-on process.

According to the various embodiments and aspects of the invention it is possible to achieve various results, such as:

The bearing section can prevent the screw from slipping out of the holding unit. When the first latching means is used, the screw can be held in the holding unit in a captive fashion in both longitudinal directions.

It is possible to ensure that the screw is held centrally in the holding unit solely by means of the head so that the shank is exposed. The underside of the head (the contact face for the connection parts) can also be kept completely free here.

The screw can, for example, be manufactured economically as an extruded part without subsequent working.

The holding part makes it possible to expose the underside of an inserted connection part and to insert an attachment element such as a blind hole bolt into the holding unit in order to make contact with the underside of a connection part.

The connection parts can, for example, be fitted by a cable harness manufacturer, but it is also possible to insert them subsequently when the cable harness is mounted, without removing the contact-making unit. Subsequent insertion of connection parts in a workshop is possible without removing the contact-making unit.

The closed design of the holding unit makes it possible to easily position it correctly in a mouthpiece of the screwing tool.

In addition, the holding unit can be manufactured from plastic, for example by means of an injection moulding tool without a slide.

Compared to known solutions in which a nut or some other part on the outside of the threaded bolt serves as a surface coating protection, a series of further advantages can be achieved, such as are described in particular in the German patent application 10 2006 056 065.5 mentioned above. Reference is made here to its disclosure contents. The disclosure of this application is to be considered as being included in the scope of the present application through reference.

When the cable harness is mounted, it is not possible for any part to be lost since they are either fixedly mounted on the bodywork or on the cable set (of the contact-making unit).

In particular a blind hole bolt of the type described above can be used as an attachment element into which the screw can be screwed. In this context, a standard weld head can be used. Using such a welded bolt avoids holes in the piece of sheet metal (sound bridges and penetration of moisture are avoided). There is no disruptive surface coating in the contact area.

Since the connection parts (cable lugs) are accommodated in the holding unit before the mounting process, it is possible to prevent the connection parts from scratching the surface coating of the bodywork of a vehicle or the like.

Finally it is possible to ensure that a connection part seals off a non-corrosion-protected area in the interior of a blind hole bolt from the outside.

The premounted contact-making unit described above and the corresponding attachment methods for this purpose can ideally be implemented in conjunction with a hollow bolt which is welded to a piece of sheet metal by means of a conventional bolt (stud) welding process, for example. Such a hollow bolt has on the inner circumference an inner thread, preferably an inner section which can be tapped by a screw with a self-tapping thread. In addition, it is particularly preferred if this hollow bolt is closed off with a plug, preferably composed of plastic, after said hollow bolt has been welded on to the workpiece or piece of sheet metal. This can prevent the inner section being coated with an insulating layer during a subsequent surface-coating process or the like. When the screw is screwed into the inner section, the plug can then be pressed downward onto the bottom of the hole of the hollow bolt and remain there.

With such a hollow bolt it is possible, according to a further aspect of the invention, to use an attachment arrangement which serves to attach a hose line to a workpiece such as a piece of sheet metal, in which case the outer circumference of the hose line is electrically conductive and the attachment arrangement has a line holder made of an electrically conductive plastic and screw whose head engages behind the line holder and which can be screwed into such a hollow bolt which is secured to the workpiece.

Such an attachment arrangement can be used in particular to attach petrol lines or the like to the bodywork of a vehicle, in which case static charges can be particularly satisfactorily diverted via this attachment arrangement. Electrical contact can be implemented over a large area by means of the connection between the screw and the hollow bolt (the threaded engagement) and static charges on the hose line can be reliably diverted via said electrical contact.

It is particularly preferred here if the hollow section of the hollow bolt is closed off with a plug which can be pressed into the hollow section, before the screw is screwed into the hollow bolt.

It is also preferred for the line holder to have a receptacle section into which the head of the screw can be clipped in a captive fashion in order to form a premounted contact-making unit.

The line holder can also have receptacle sections for clipping in one or more hose lines. Instead of hose lines, it is also possible to use other lines which are embodied in an electrically conductive form on the outer circumference.

In the present context, the screw is to be understood as referring generally to a component which has a threaded shank and a head. The threaded shank can be here a shank with an outer threaded section or a hollow shank having an inner threaded section. A threaded section can be a section with a self-tapping thread or else a tappable section into which a thread can be tapped by means of a complementary component with a self-tapping thread. The term self-tapping thread is intended to encompass all types of self-tapping, self-cutting threads etc.

Of course, the above-mentioned features, which are also explained below, can be used not only in the respectively specified combination but also in other combinations or alone without parting from the scope of the present invention.

BRIEF DESCRIPTION OF THE DRAWINGS

Exemplary embodiments of the invention are illustrated in the drawing and explained in more detail in the following description. In the drawing:

FIG. 4 shows an embodiment of a screw for a contact-making unit according to the invention;

FIG. 5 shows a holding unit according to an embodiment of the invention;

FIG. 6 is a schematic sectional view of the holding unit in FIG. 5 and of the screw in FIG. 4, with a section along a line A being shown on the left-hand side, and a section along a line B being shown on the right-hand side;

FIG. 10 is a schematic view of the premounted contact-making unit in FIG. 9 with an inserted connection part, screwed into a blind-hole earthing bolt which is attached to a piece of sheet metal;

FIG. 11 is a schematic side view of an embodiment of a screwing tool according to the invention;

FIG. 12 is a detailed sectional view of a mouthpiece region of the screwing tool in FIG. 11;

FIG. 13 shows a view of the screwing tool in FIGS. 11 and 12 from below;

FIG. 14 shows an alternative embodiment of a premounted contact-making unit with a smaller number of longitudinal webs and with recesses for implementing an anti-rotation section;

FIG. 15 is a detailed view of a mouthpiece region of a further embodiment of a screwing tool according to the invention, in particular for use with holding parts which have an anti-rotation section; and FIG. 16 shows a view of the screwing tool in FIG. 15 from below;

DETAILED DESCRIPTION OF EXEMPLARY EMBODIMENTS OF THE INVENTION

Figure 1:
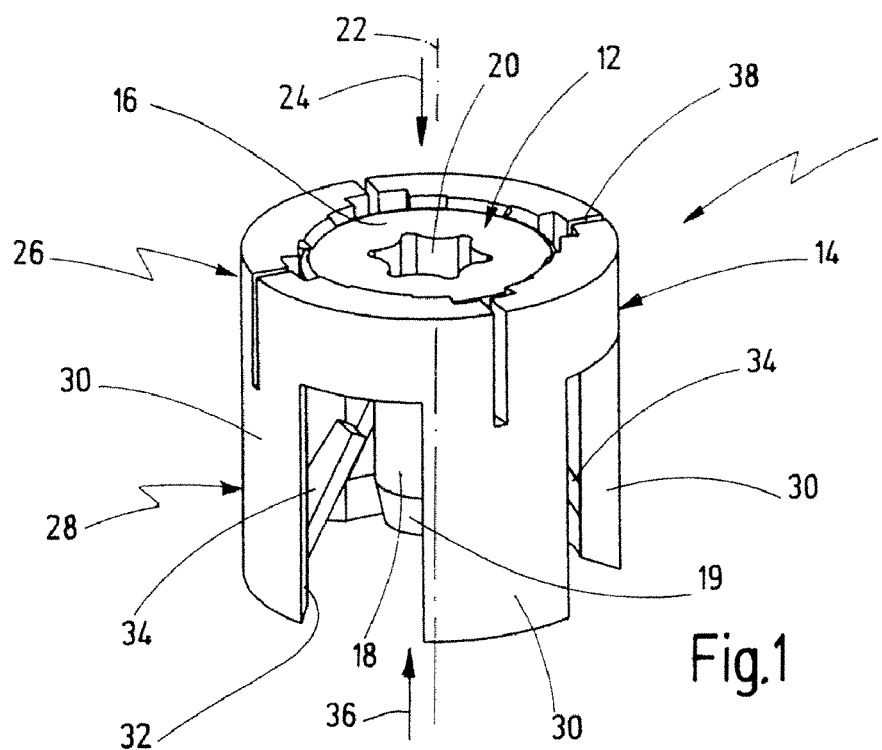
FIG. 1 is a perspective schematic view of a premounted contact-making unit according to a first embodiment of the invention.

FIG. 1 shows a first embodiment of an inventive, premounted contact-making unit which is generally denoted by 10.

The contact-making unit 10 contains a screw 12 which forms a first attachment element, and a holding unit 14. The screw 12 is preferably manufactured from an electrically conductive material such as metal, for example in the form of an extruded part. The holding unit 14 is preferably manufactured from an electrically insulating material such as plastic, preferably as an injection moulded part, in which case an injection mould without a slide can be used.

The screw 12 has a head 16 and a shank 18. The shank 18 is embodied with a threaded section which is not designated in more detail in FIG. 1. The threaded section may be formed by a self-forming or self-tapping or self-cutting thread. The end of the shank 18 which lies opposite the head 16 is embodied as a centering section 19. The latter can, as illustrated, be a frustoconical section.

On the side of the head 16 lying opposite the shank 18 a tool engagement portion 20 is provided. The tool engagement portion may be embodied in the form of a recess on the head 16, for example, as a hexagon socket, a multipoint socket or as a Phillip's recessed head. When the tool engagement portion 20 is embodied in the form of a recess, it is easily possible for the head 16 not to protrude with respect to the holding unit 14. However, the tool engagement portion may alternatively be formed as a projecting or protruding portion such as a hexagonal projection outer polygonal projection.

The screw 12 is held in the holding unit 14 along a longitudinal axis 22 and aligned therein.

In this context, the screw 12 is inserted into the holding unit 14 in an insertion direction 24 which is aligned parallel with the longitudinal axis 22.

The holding unit 14 has an annular section 26 which is embodied so as to be concentric with respect to the longitudinal axis 22 and which forms a screw-holding section. In addition, the holding unit 14 has a plurality of longitudinal webs 30 (four in the present case) which each extend in the longitudinal direction from the annular section 26 and form a connection part-holding section 28.

In each case insertion slots 32 for connection parts are formed between the longitudinal webs 30. The insertion slots 32 extend from a lower end of the holding unit 14 to the annular section 26. In each case latching webs 34 extend radially inwards from the inside of the longitudinal webs 30, specifically obliquely upwards from a lower end of the holding unit 14. The latching webs 34 form second latching means.

At the lower end, the holding unit 14 consequently has a round insertion opening which is configured for the insertion of connection parts such as cable lugs, specifically in an insertion direction 36 which is opposed to the insertion direction 24 for the screw 12.

The screw 12 is completely accommodated in the holding unit 14 so that no section of the screw 12 protrudes with respect to the holding unit 14. The annular section 26 surrounds the head 16 of the screw 12. The longitudinal webs 30 surround the shank 18 of the screw 12 concentrically. The upper end of the screw 12 lies here somewhat below the upper end of the annular section 26. In a corresponding way, a lower end of the shank 18 lies somewhat above the lower end of the longitudinal webs 30.

The present use of the terms top and bottom refers respectively to the illustration used in the figures and serves for simpler description, but is in no way to be understood as restrictive since the subject matters described in this application can be used in any desired orientation and angular position.

The head 16 is held within the annular section 26 in such a way that the screw 12 is positioned and held centred in the longitudinal direction 22 within the holding unit 14. In the context, first latching means which are still to be described in more detail engage behind the head 16 of the screw 12. The holding unit has, in the region of the annular section 26, longitudinal slots 38 which each extend downwards from the upper end of the holding unit 14, approximately as far as the level of the upper end of the insertion slots 32 or somewhat beyond it. The longitudinal slots 38 make it possible for the annular section which is interrupted by these longitudinal slots 38 to widen radially in order to permit latching insertion of the head 16 of the screw 12.

The premounted contact-making unit 10 can be mounted and despatched, for example, in the form of bulk material. The compact and largely enclosed external shape of the holding unit 14 makes it unlikely that the premounted contact-making units 10 will become caught on one another. Individuation is easily possible.

In the embodiment in FIG. 1 and also in all the following embodiments, the screw 12 can, as illustrated in FIG. 1, have a shank 18 with an externally threaded section. The shank 18 can, however, also be respectively embodied as a hollow shank with an internally threaded section. In this case, the bolt 50 is respectively embodied with an externally threaded section.

Figure 2:
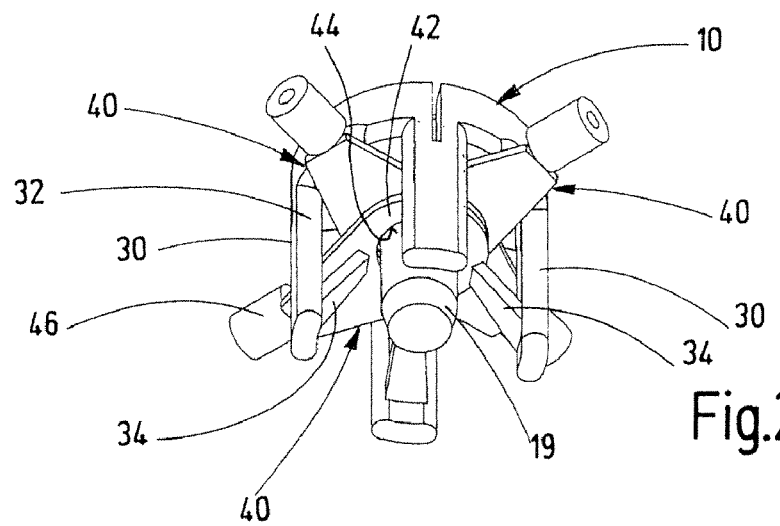
FIG. 2 shows the contact-making unit in FIG. 1 from obliquely below with cable lugs introduced.

FIG. 2 shows how a multiplicity of connection parts 40 in the form of cable lugs can be inserted into the premounted contact-making unit 10. This is generally done from below (in the insertion direction 36). The connection parts 40 each have a contact section 42 with a hole 44 and a connection section 46. The contact section 42 is manufactured from an electrically conductive material, preferably from metal, and is generally of flat design.

A connection part 40 is inserted into the premounted contact-making unit 10 in such a way that the contact section 42 is pushed by means of its hole 44 onto the shank 18 of the screw 12, in which case the respective connection section 46 extends radially outwards through one of the insertion slots 32.

Further connection parts 40 can be introduced in a similar way into the premounted contact-making unit 10, in which case the connection section 46 thereof is guided in each case through another insertion slot 32. In this way, a star-like orientation of the connection sections 46, as shown in FIG. 2, is obtained when four connection parts 40 are inserted into the premounted contact-making unit 10.

The contact section 42 of the connection part 40 which is inserted first into the contact-making unit 10 makes contact here with the underside of the head 16 of the screw 12.

When the connection parts 40 are inserted, the latching webs 34 are pressed radially outwards. The arrangement and length of the latching webs 34 are dimensioned such that even after the specified number of connection parts 40 has been inserted there is still sufficient distance remaining in the axial direction in order to permit the connection parts 40 to snap back reliably and thus become secured in a latching fashion in the contact-making unit 10.

The latching webs 34 may be made somewhat shorter so that the connection parts 40 have play in the axial direction in the premounted contact-making unit 10. The play can be dimensioned in such a way that even one further additional connection part or a plurality of additional connection parts 40 can be inserted into the contact-making unit 10 (if, for example, an additional cable lug is to be fitted on after the final mounting, for example for the subsequent installation of electrical systems in a vehicle).

Figure 3:
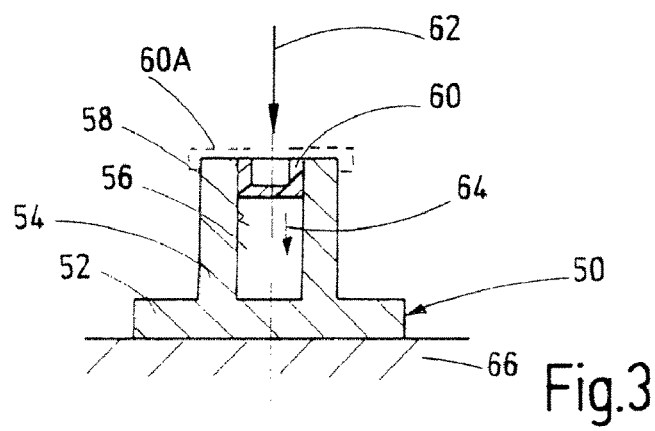
FIG. 3 shows a blind hole bolt, which can preferably be used for implementing an earthing connection and has a cover (plug)

FIG. 3 is a schematic diagram of a blind hole bolt (stud) 50 which forms a second attachment element.

The blind hole bolt 50 has a flange 52 which is attached to a piece of sheet metal 66 (for example by bolt (stud) welding), and a shank section 54 which extends perpendicularly upward from the flange 52. A blind hole 56, which is open in the upward direction, is formed in the shank section 54. A thread section 58 in the form of a tappable section is formed on the inner circumference of the blind hole 56. In other words, the thread section 58 is made smooth on the inner circumference of the blind hole 56, but in terms of its material it is configured here in such a way that it enters into a threaded connection with a tapping screw, such as the screw 12. The material of the blind hole bolt 50 an electrically conductive material. This electrically conductive material could be, for example, a steel alloy or aluminum.

A covering part in the form of a plug 60 is introduced into the blind hole 56. The plug 60 is manufactured, for example, from a plastic material and is pressed into the blind hole 56 so that it seals off the blind hole 56 in the region of its opening. The blind hole bolt 50 and the plug 60 form a prefabricated attachment unit which can be welded onto the piece of sheet metal 66, for example in an automated fashion using a bolt (stud) welding device.

The blind hole bolt 50 is connected to the piece of sheet metal 66 in such a way that an electrically conductive connection is established between them. It is also possible, for example, to bond the blind hole bolt 50 onto the piece of sheet metal 66 by means of a conductive adhesive, or the like.

The blind hole bolt 50 is embodied as an earthing bolt and is configured to be connected electrically to a connection part 40. As a result, the connection part 40, for example in the form of a cable lug 40, can be connected electrically to earth (for example of the bodywork of a vehicle as the piece of sheet metal 66).

The blind hole bolt 50 may be used in conjunction with the pre-mounted contact-making unit 10. Owing to the central orientation of the shank 18, the contact-making unit 10 which is equipped with a plurality of connection parts 40 (see for example FIG. 2) can then easily be fitted onto the opening of the blind hole 56 and screwed into the blind hole 56 by means of a tool, specifically in a screwing-in direction 62. In this context, a force 64 which presses the plug 60 downwards in the direction of the bottom of the blind hole is exerted on the plug 60. In addition, a threaded engagement, and thus an electrical connection, is established between the threaded section of the shank 18 and the thread section 58 of the blind hole 56. During the screwing tight process, the contact sections 42 are pressed together between the head 16 of the screw 12 and the upper side of the shank section 54. In the process, the upper side of the shank section 54 may not be able to form a secure electrical contact (for example owing to a surface coating of the blind hole bolt 50). However, the inside of the blind hole 56 is not provided with any surface coating during such a surface-coating process, specifically owing to the plug 60.

Electrical contact between the connection parts 40 and the piece of sheet metal 66 is finally established via the underside of the head 16, the shank 18 and the shank section 54.

In addition, during the mounting process it is not necessary to use any covering parts at all since the plug 60 remains within the blind hole 56 in the mounted state.

FIG. 3 shows an alternative embodiment of a covering part 60A (indicated by dashed lines). Such a covering part 60A would be configured also to cover the upper side of the shank section 54, but it has to be discarded during mounting, which increases the overall expenditure.

As already mentioned above, the premounted contact-making unit 10 is made available with a screw 12 which is matched to the blind hole bolt 50 (in particular in terms of the threaded sections and in terms of the materials used etc.). For this reason, the premounted contact-making unit 10 can be made available by the same manufacturer as the manufacturer of the blind hole bolt 50.

The premounted contact-making unit 10 is then used by a manufacturer for cable harnesses for premounting so that a cable harness which has finally been delivered contains at least one contact-making unit 10, in particular a plurality thereof, in which connection parts 40 are already accommodated in the contact-making unit 10.

When such cable harnesses are mounted, it is then possible, if appropriate, to insert a further connection part 40 additionally into the holding unit 14 from below, specifically, before the screw 12 is screwed into the blind hole bolt 50.

The premounted contact-making unit 10 can also subsequently be screwed off, in which case the connection parts 40 are also securely held in the blind hole bolt 50 even after they have been screwed out of it (owing to the latching webs 34). In addition, a further connection part can subsequently be introduced into the holding unit 14 (for example within the scope of retrofitting of electrical devices in a motor vehicle), in which case the screw 12 is subsequently screwed into the same blind hole bolt 50 again.

When a screw with an internally threaded section is used, the bolt in FIG. 3 can also be embodied as a solid bolt with an externally threaded section. In this case, the plug 60 could be replaced by a ring which protects the externally threaded section in the case of a surface-coating process or the like in the same way as the plug 60 in FIG. 3 protects the internally threaded section of the blind hole bolt 50.

All the following embodiments of contact-making units are based on the same design and the same function as described above with respect to the contact-making unit 10. Identical elements are therefore also provided with the same reference symbols in the text which follows. In the following paragraphs, reference is consequently made only to differences.

FIGS. 4 to 6 show an exemplary embodiment of a handling unit 14 according to the invention for a premounted contact-making unit 10 according to the invention.

Here, as shown in FIG. 4, the screw 12 has, on the upper side of its head 16, a circumferential bearing section 70 in the form of a circumferential collar or flange section.

A corresponding shoulder section 72 is provided on the holding unit 14, as is shown in FIG. 5. The shoulder section 72 contains one or more projections which protrude radially inwards from the annular section 26 and which form shoulders on which the bearing section 70 can be supported in the axial direction.

In addition, latching projections 74 which form first latching means are provided on the holding unit 14. The latching projections 74 engage behind the head 16 or the bearing section 70 of the head 16 of the screw 12 after the latter has been inserted in the axial direction 24 into the holding unit 14. The axial distance between the shoulder section 72 and the latching projections 74 is selected here in such a way that the screw 12 is securely held or held centered in the longitudinal direction in the holding unit 14. This permits, on the one hand, easy pushing on of connection parts 40 into the contact-making unit 10 which is premounted in this way. On the other hand, this also facilitates a later mounting process in which case it is, for example, sufficient to center the holding unit 14 with respect to a blind hole bolt 50.

As is apparent in FIG. 5, the shoulder section 72 and the latching projections 74 are arranged distributed in the circumferential direction so that they ideally do not overlap in the circumferential direction. As a result, cost-effective manufacture is possible in one injection mould without a slide. In a corresponding way, FIG. 6 shows, on the left-hand side, how a latching projection 74 engages behind the upper side of the head 16 of the screw 12, and the right-hand side in FIG. 6 shows how a bearing section 70 is supported on the shoulder section 72.

FIG. 6 also shows that there is sufficient space between the upper side of the latching webs 34 and the underside of the head 16 of the screw 12 to accommodate a suitable number of contact sections 42 between them. In addition it is shown that a threaded section 78 is formed on the outer circumference of the shank 18 of the screw 12, said threaded section 78 being preferably formed as a tapping threaded section.

Figure 7:
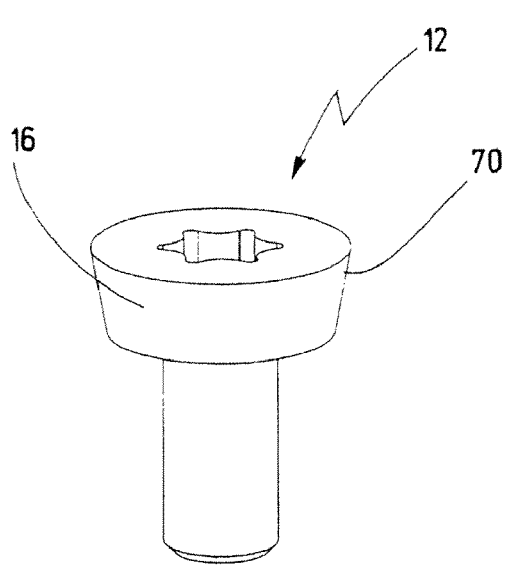
FIG. 7 shows an alternative embodiment of a screw for a contact-making unit according to the invention.
Figure 8:
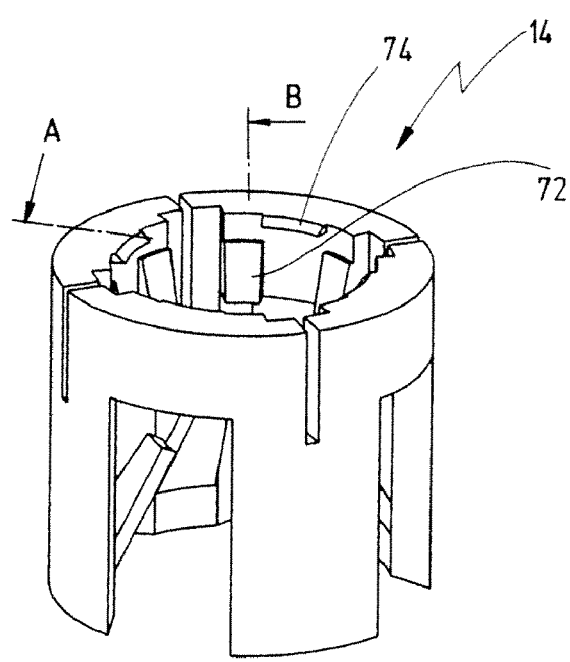
FIG. 8 shows a further embodiment of a holding unit according to the invention for use with a screw according to FIG. 7.
Figure 9:
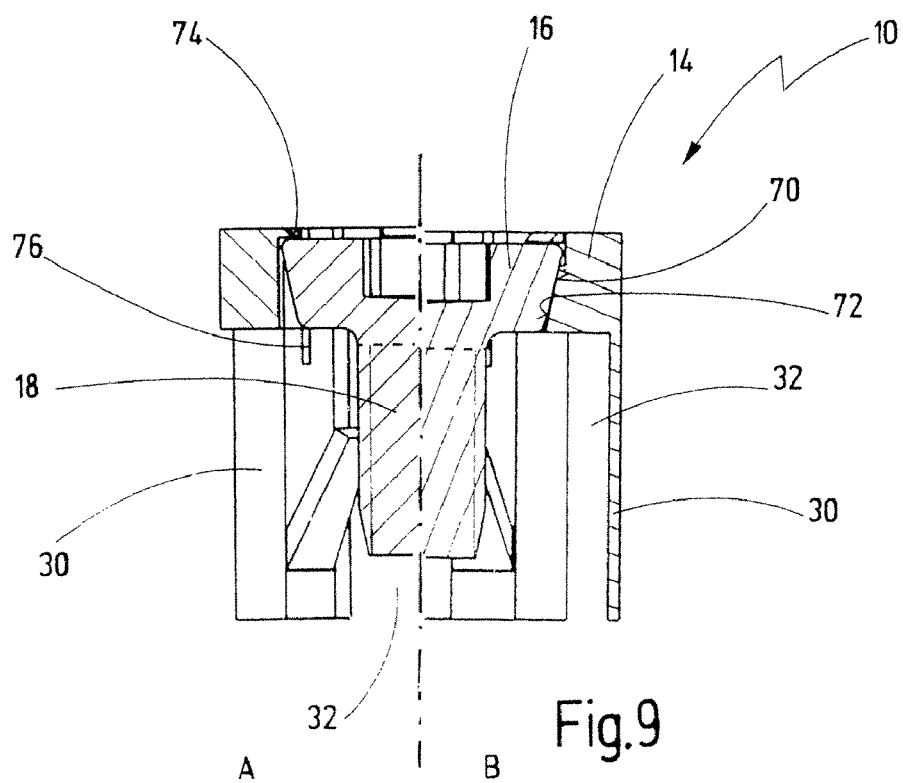
FIG. 9 shows a schematic sectional view of the holding unit in FIG. 8 and of the screw in FIG. 7, with the left-hand side showing a section along a line A, and the right-hand side showing a section along a line B.

FIGS. 7 to 9 show alternative exemplary embodiments of a holding unit according and of a contact-making unit. The holding unit 14 and the contact-making unit 10 in FIGS. 7 to 9 are generally identical to the holding unit 14 and the contact-making unit 10 in FIGS. 4 to 6 in terms of their design and method of functioning. In the text which follows, details are given only on differences.

For example, the screw 12 according to FIG. 7 has a frustoconical head 16 which tapers inwardly in the downward direction. Consequently, an upper section of this conical shape forms a bearing section 70.

In a corresponding way, the shoulder section 72 of the holding unit 14 is formed by a plurality of frustoconical projections which are formed so as to taper inwardly from top to bottom. The screw 12 can therefore be supported by means of the conical bearing section 70 on the shoulder section 72, which is of a corresponding conical design, of the holding unit 14.

FIG. 10 shows, in a schematic form, how electrical contact can be made between a connection part 40 and a piece of sheet metal 66 in order to realize an earthing contact. In this context, just one connection part 40 is introduced into a premounted contact-making unit 10 for reasons of clearer illustration. The premounted contact-making unit 10 is screwed into a blind hole bolt 50 which is connected to the piece of sheet metal 66 in an electrically conductive fashion. It is apparent that the plug 60 is located here on the bottom of the blind hole of the blind hole bolt 50. The path of an electric current i is also indicated schematically in FIG. 10, specifically from the connection part 40 via the underside of the head 16 of the screw 12 into the screw and from there via the threaded engagement between the screw 12 and the blind hole bolt 50 into the shank section 54 of the bolt, and from there into the piece of sheet metal 66 via the flange 52.

It is clear that a similar good electrical connection can also be established if a plurality of connection parts are used. In such a case, the contact would then be made by way of the pressure over the unit surface area between the contact sections 42 of the connection parts, and from there via the underside of the head 16.

FIGS. 11 to 13 illustrate a first embodiment of a screwing tool 90 for screwing a premounted contact-making unit 10 onto a blind hole bolt 50.

The screwing tool 90 is embodied in the present case as a tool which can be handled manually, and it has a handle 92. However, the tool 90 can of course also be attached, for example to an arm of an assembly robot, without using a handle.

At the front end of the screwing tool 90, a mouthpiece 94 is provided, said mouthpiece 94 having, as illustrated in FIG. 12, a holding device for the premounted contact-making unit 10. The holding device preferably engages on an upper end of the holding unit 14, specifically in a clamping or latching fashion.

In addition, the screwing tool 90 has, at this end, a tool section 97 which is configured to engage into the tool engagement portion 20 of the screw 12.

Finally, the screwing tool 90 has an anti-rotation device 98 which prevents rotation of the connection parts 40 during the screwing in of the screw 12 into the blind hole bolt 50. In the case of the screwing tool 90 in FIGS. 11 to 13, the anti-rotation device 98 is formed by the mouthpiece 94 which extends in the axial direction beyond the holding device 96. In this context, the mouthpiece 94 has a plurality of radial recesses 100. The radial recesses 100 extend from the lower end of the mouthpiece 94 in the axial direction and are oriented with the longitudinal slots 38 if a contact-making unit 10 is introduced into the holding device 96.

Consequently, the connection sections 46 extend from the connection parts 40 through the radial recesses 100. If a torque is applied to the connection parts 40 during the screwing in of the screw 12 into the blind hole bolt 50, the connection sections 46 abut in the circumferential direction against the webs formed between the radial recesses 100. This prevents rotation of the connection parts 40.

FIG. 14 shows an alternative exemplary embodiment of a premounted contact-making unit 10.

Firstly, the contact-making unit 10 in FIG. 14 differs from the contact-making units described hitherto in that a smaller number of longitudinal webs 30 is provided. In the present case, only three longitudinal webs 30 are provided, two of which lie diametrically opposite with respect to the longitudinal axis 22. The third longitudinal web 30 is arranged on one side between the two longitudinal webs 30 lying opposite. Consequently, in the contact-making unit 10 two narrow insertion slots 32 are provided and they are each configured essentially to receive a connection section 46, and an insertion slot 32', which is broader in relative terms and into which a plurality of connection sections 46 (a total of four in the illustration in FIG. 14) can also be accommodated.

This embodiment is suitable, for example, for inserting a plurality of such connection parts 40 into the premounted contact-making unit 10 in situ during the mounting process after having been mounted on a cable harness.

Generally, the number of longitudinal webs 30 is of course not restricted to the numbers shown. In the simplest case, it is also possible to provide just one longitudinal web 30 which is virtually circumferential and clears only a single insertion slot 32. Depending on the size of the connection parts 40 and the associated connection sections 46 it is, however, also possible to provide a number of significantly more than three or four insertion slots 32. However, the embodiments with three or four insertion slots 32 are, as described in the embodiments above, currently considered to be preferred.

FIG. 14 also shows that the holding unit 14 has, in the upper region of its annular section 26, a polygonal section 102 which is indicated by dashed lines in FIG. 14.

If the holding unit 14 is equipped with such a polygonal section 102, it is also possible to implement an anti-rotation prevention means using, for example, solely a holder 96 of a screwing tool 90.

A further embodiment of a screwing tool 90, which corresponds generally in terms of design and method of functioning to the screwing tool in FIGS. 11 to 13 is illustrated in FIGS. 15 and 16. However, the mouthpiece 94 is of axially relatively short design here and has a holding device 96 which is embodied in the form of a polygon on the inner circumference in order to grasp the holding unit 14 on its corresponding polygonal section 102.

When a torque is applied to the connection parts 40, they consequently abut against the side edges of the insertion slots 32. Rotation of the holding unit 14 is, however, avoided by virtue of the anti-rotation device 98 which acts on the polygonal section 102 of the holding unit 14.

The advantage in this embodiment is the short design of the mouthpiece 94 in the axial direction. On the other hand, the holding unit 14 must be configured, in terms of design and material, so as to absorb the moments and forces which occur.

Figure 17:
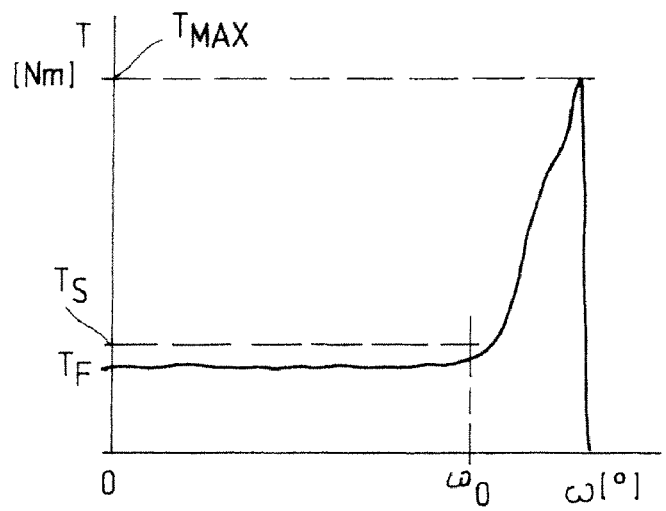
FIG. 17 is a diagram of the torque plotted against the rotational angle during a connecting process in which an individual connection part is secured between the attachment elements.
Figure 18:
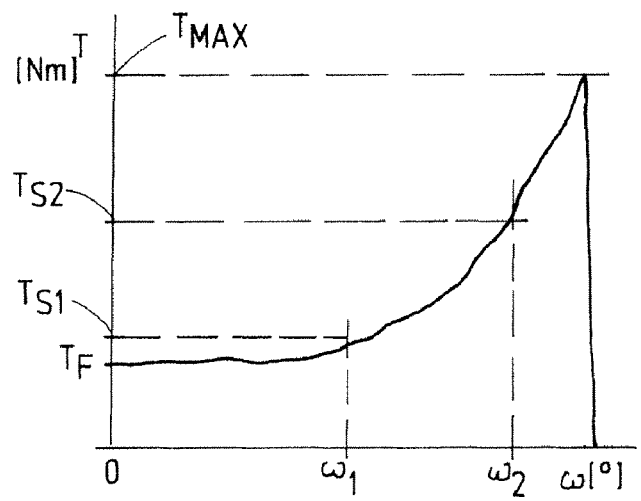
FIG. 18 shows a curve, corresponding to FIG. 17, of the torque plotted against the rotational angle, in which a relatively large number (for example three) of connection parts has been inserted between the attachment elements.

FIGS. 17 and 18 are diagrams of the torque T applied during a screwing process, plotted against the rotational angle ω.

Whereas in conventional screwing connections the start of the threaded engagement cannot be sensed since increased torque is not required for the screwing in, the start of the threaded engagement can be sensed when a connection is established by means of a self-tapping thread. This is because in the case of a self-tapping thread an increased torque demand occurs from the start of the threaded engagement and said torque demand can be determined, for example, by means of the electrical motor current of a screwing tool.

The sensing of the start of the threaded engagement can then also be used to sense the rotational angle ω starting from this time.

FIG. 17 illustrates, for example, the start of the threaded engagement at the zero point of the diagram. Starting from this time or starting from this rotational angle, an increased tapping moment or cutting moment $T_F$ occurs.

FIG. 17 also shows that starting from a rotational angle $\omega_0$ the torque demand rises further since the tightening phase starts from this time. The torque then increases from this value to a maximum value $T_{MAX}$. This value corresponds to the tightening torque. Subsequent to this, the electric motor current or the drive of the screwing tool of some other kind is switched off so that the torque T drops to zero.

Owing to the sensed rotational angle $\omega_0$ from which the necessary torque exceeds a specific threshold value $T_S$ which is above the tapping moment $T_F$, it is possible to determine how many rotations are necessary to tighten the threaded connection. From this it is possible to calculate how many connection parts are positioned between the attachment elements. In addition this also makes it possible to monitor other parameters of the connection process, for example the length of the screw, the overall thickness of the packet composed of connection elements (and thus possibly the correct equipment), and finally the correct seating and the tightening torque $T_{MAX}$.

It is therefore possible to monitor the entire connection process. If, for example, an excessively long screw were to be used, the tightening torque would rise significantly too early or at too small a rotational angle.

Of course, instead of or in addition to the rotational angle ψ it is also possible to measure the time during the connection process.

FIG. 18 shows a curve which is similar to FIG. 17 and in which a relatively large number of, for example, three connection elements have been inserted between the first and second attachment elements. It is apparent that an increased torque demand already occurs starting from a rotational angle $\omega_1$ since the packet of connection elements which is present between the attachment elements is thicker. The curve can also firstly rise somewhat less steeply than in the case in FIG. 17, since the play which is present between the connection elements must firstly be eliminated before the actual tightening of the screwed connection occurs (from $\omega_2$). This is illustrated in a somewhat exaggerated form in FIG. 18.

FIGS. 17 and 18 illustrate that the torque to $\omega_0$ or $\omega_1$ remains approximately the same. In practice, the necessary torque will, however, already gradually rise in advance owing to the increasing threaded engagement. Since when there are a plurality of connection elements the length of the threaded engagement is smaller until the value of $\omega_1$ is reached, the associated value $T_{S1}$ in FIG. 18 is generally also smaller than the value $T_S$ in FIG. 17.

Instead of threshold value profiles, as shown at $T_S$, the measured curves can also be compared with envelope curves in order to achieve better classification of the respective connection process. Such threshold value curves or envelope curves can be stored in advance in a control device.

Figure 19:
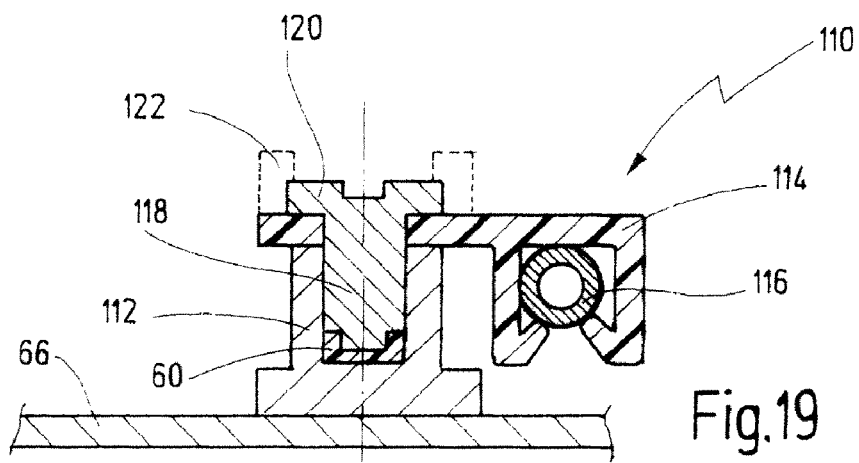
FIG. 19 shows an attachment arrangement for a hose line according to a preferred embodiment of the invention in a schematic cross-sectional illustration.

FIG. 19 shows an attachment arrangement for a hose line according to one aspect of the invention. The attachment arrangement is designated generally by 110 in FIG. 19 and has a hollow bolt 112 which is welded onto a workpiece 66 such as a piece of sheet metal of the bodywork of a vehicle. In addition, the attachment arrangement 110 has a screw 118 whose head 120 presses a line holding device 114 made of electrically conductive plastic material onto the upper side of a hollow bolt 112. The line holding device 114 has a line accommodation section into which a hose line 116 is clipped.

With the attachment arrangement 110 according to the invention, static charges on the hose line 116 (whose surface is preferably composed of metal as in the case of fuel lines) can be diverted in a particularly advantageous way, specifically via the line holding device 114 (which is preferably composed of an electrically conductive plastic) via the shank of the screw 118 or the underside of the head 120 of the screw and via the threaded engagement between the screw 118 and the hollow bolt 112. In addition, electrical charges are conducted via the hollow bolt 112 into the workpiece 66 which is usually connected to earth or forms the earth.

The screw 118 is preferably equipped with a self-tapping thread, and the hole or the bore of the hollow bolt 112 is embodied as a smooth but tappable thread section. Reliable electrical contact can be ensured between the screw 118 and the hollow bolt 112 by means of the tapped threaded engagement.

Together with the line holding device 114, the screw 118 can form a premounted contact-making unit 10. It is understood here that the head 120 can be embodied in a similar way to the head 16 of the screw 12 of the previous embodiments. In a corresponding way, the line holding device 114 can have a screw-holding section which corresponds to the screw-holding section 26 of the abovementioned embodiments.

What is claimed is:

1. A premounted contact-making unit comprising:
a screw with a head and a shank, and
a holding unit,
wherein the holding unit comprises a connection part-holding section into which at least one connection part can be inserted, and a screw-holding section into which the screw is inserted in a longitudinal direction of the holding unit in such a way that the screw is held captively in the screw-holding section in the longitudinal direction but in a rotatable fashion, and in that a connection part which is inserted into the connection part-holding section can make electrical contact with the inserted screw,
wherein a radially protruding bearing section is formed on the head of the screw, and the screw-holding section has a shoulder section which axially supports the bearing section on the holding unit; and
wherein the holding unit has an outer circumference and an anti-rotation section located on the outer circumference; and an anti-rotation device of a tool which can screw the screw onto an attachment element can engage the anti-rotation section.

2. The contact-making unit according to claim 1, wherein the screw-holding section has a first latching part which engages a surface of the bearing section opposite to the surface supported by the shoulder section so that the screw is held captively in the longitudinal direction in the holding unit.

3. The contact-making unit according to claim 2, wherein the bearing section, the shoulder section and the first latching part are formed such that the screw is held axially aligned in the holding unit.

4. The contact-making unit according to claim 1, wherein at least one of the bearing section and the shoulder section are stepped.

5. The contact-making unit according to claim 1, wherein at least one of the bearing section and the shoulder section are conical.

6. The contact-making unit according to claim 1, wherein the screw is held completely within the holding unit.

7. The contact-making unit according to claim 2, wherein the connection part-holding section has a second latching part which holds the at least one connection part in a captive fashion in the longitudinal direction.

8. The contact-making unit according to one of claim 1, wherein the connection part-holding section further comprises a radial recess through which a connection section of the connection part can extend outwards in the radial direction.

9. The contact-making unit according to claim 8, wherein the radial recess extends in the longitudinal direction from one end of the holding unit.

10. The contact-making unit according to claim 1, wherein the connection part-holding section is configured to hold a plurality of connection parts, and wherein the connection parts can be inserted into the connection part-holding section exclusively in one direction which is opposed to the direction in which the screw is inserted into the screw-holding section.

11. The premounted contact-making unit according to claim 1, wherein the holding unit has a plurality of longitudinal webs which extend in the longitudinal direction from one side of the screw holding section, wherein at least one connection part can be inserted between the plurality of longitudinal webs in such a way that a connection section of the connection part extends in the radial direction between two longitudinal webs, wherein a second latching part which is configured so as to hold an inserted connection part in a captive fashion are formed on the longitudinal webs.

12. An electrical grounding preassembly, operable for engagement with a blind hole bolt stud welded to a vehicle structure, comprising a grounding screw; a plurality of wire connectors, and a holding unit; and wherein:
the holding unit is substantially tubular with a long central axis between a first end and a second end and includes side walls defining a central bore between the first end and the second end, and an annular end section joined to the side walls at the first end and defining a recess along the central axis, and the second end is substantially open, and the side walls are crenellated with a plurality of circumferentially spaced slots open at the second end and closed toward the first end,
the grounding screw includes a shank with a first end and a second end, and a flange head located at the first of the shank, and the shank includes a threaded portion operable to threadably engage the blind hole of the bolt stud; and the flange head includes a tool engagement structure, and the grounding screw is coaxially located in the holding unit with the flange head of the grounding screw held axially captive and rotatably supported in the annular end section of the holding unit and the threaded portion of the shank extends toward the second end of the holding unit, and
each of the plurality of wire connectors includes a planar lug portion and a wire connection portion, and the lug portion defines a through hole sized to fit over the shank of the grounding screw; and
when preassembled the head is rotatably mounted in the recess of the holding unit's annular end section with the shank projecting along the central axis toward the holding units second end, and the lug portions of the plurality of wire connectors are stacked axially within the central bore with the screw shank projecting through and beyond the plurality of through holes, and each of the plurality of wire connection portions project radially beyond the side walls through a respective slot.

13. The electrical grounding preassembly of claim 12 wherein the holding unit is substantially in the form of a hollow cylinder.

14. The electrical grounding preassembly of claim 12 wherein the annular end section of the holding unit is substantially split by a longitudinal expansion slot.

15. The electrical grounding preassembly of claim 12 wherein the recess of the holding units annular end section further include a shoulder and a latch axially spaced from the shoulder, the shoulder and the latch project radially inward toward the central axis; and when preassembled the head of the screw is held axially between the shoulder and latch.

16. The electrical grounding preassembly of claim 12 wherein the holding unit further includes a latch located within the central bore and projecting radially inward from the side wall, the latch operative to permit the lug portions of the wire connectors to slide intentionally along the screw shank from the second end towards the screw head, but prevent the lug portions from sliding unintentional back to the second end of the shank.

17. The electrical grounding preassembly of claim 12 wherein the screw head is in the form of a frustoconical section and the recess in the annular end section of the holding unit is includes a corresponding frustoconical radial taper to center and hold the screw in the holding unit.

18. An electrical grounding pre-assembly operable for holding a plurality of electrical lugs in engagement with a blind hole bolt stud welded to a vehicle structure, the grounding pre-assembly comprising:
a holding unit including a substantially tubular body defining a longitudinal axis between a holding unit first end and a holding unit second end, the body further including:
a cylindrical side wall partially defining a central bore between the first end and the second end of the holding unit, and the side walls are crenellated with a plurality of circumferentially spaced slots open at the second end and closed toward the first end of the holding unit;
an annular end portion located at the holding unit first end and defining a screw retaining recess centered on the holding unit axis; and
a screw with a head and a shank, the head including a drive tool engagement structure, and the shank including a threaded portion for threadably engaging the blind hole of the bolt stud, and the screw is coaxially located in the holding unit with the head of the screw held axially captive and rotatable within the screw retaining recess and the screw is rotatable relative to the plurality of circumferentially spaced slots of the holding unit, and the threaded portion of the shank extends toward the second end of the holding unit.

19. An electrical grounding pre-assembly according to claim 18, and wherein the holding unit further includes a pawl located within the central bore and projecting radially inward from the side wall, the pawl operative to permit the loading of electrical lugs into the central bore by movement in a first direction from the second end of the holding unit towards the first end of the holding unit, and the pawl further operative to prevent substantial movement of the electrical lugs in a second direction opposite to the first direction.

20. An electrical grounding pre-assembly according to claim 18, and wherein the screw retaining recess of the holding unit further include a shoulder, and a latch axially spaced from the shoulder, the shoulder and the latch project radially inward toward the axis; and the head of the screw is held axially between the shoulder and latch.

* * * * *